(12) United States Patent
Kaneko

(10) Patent No.: US 12,445,562 B2
(45) Date of Patent: Oct. 14, 2025

(54) CONTROL DEVICE AND NON-TRANSITORY COMPUTER READABLE MEDIUM FOR OUTPUTTING IMAGE DATA AFTER A WAIT TIME

(71) Applicant: FUJIFILM Business Innovation Corp., Tokyo (JP)

(72) Inventor: Takeshi Kaneko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 426 days.

(21) Appl. No.: 17/891,747

(22) Filed: Aug. 19, 2022

(65) Prior Publication Data
US 2023/0308590 A1    Sep. 28, 2023

(51) Int. Cl.
*H04N 1/23* (2006.01)
*H04N 1/00* (2006.01)

(52) U.S. Cl.
CPC ....... *H04N 1/00652* (2013.01); *H04N 1/2384* (2013.01); *H04N 2201/0081* (2013.01)

(58) Field of Classification Search
CPC .................................................... H04N 1/2384
See application file for complete search history.

(56) References Cited

U.S. PATENT DOCUMENTS

| | | | |
|---|---|---|---|
| 5,726,762 A | 3/1998 | Akada et al. | |
| 7,450,143 B2 * | 11/2008 | Lee | G03G 15/04072 347/237 |
| 2023/0254416 A1 * | 8/2023 | Kimura | H04N 1/00482 358/1.15 |

FOREIGN PATENT DOCUMENTS

| | | | | |
|---|---|---|---|---|
| JP | H08-097991 A | | 4/1996 | |
| JP | 2011244364 A | * | 12/2011 | |
| JP | 2023142235 A | * | 10/2023 | ........... H04N 1/2384 |

* cited by examiner

*Primary Examiner* — Barbara D Reinier
(74) *Attorney, Agent, or Firm* — Oliff PLC

(57) ABSTRACT

A control device includes a processor configured to: instruct a document reading apparatus that reads a document at a first speed to read image data of the document; and control an image output device that outputs an image to a medium at a second speed higher than the first speed such that the image data of the document starts to be outputted to the medium after reading is started and after a wait time depending on a position at which an additional image starts to be composited when it is determined that reading is finished has elapsed.

7 Claims, 11 Drawing Sheets

CONTROL DEVICE AND NON-TRANSITORY COMPUTER READABLE MEDIUM FOR OUTPUTTING IMAGE DATA AFTER A WAIT TIME

CROSS-REFERENCE TO RELATED APPLICATIONS

This application is based on and claims priority under 35 USC 119 from Japanese Patent Application No. 2022-049025 filed Mar. 24, 2022.

BACKGROUND

(i) Technical Field

The present disclosure relates to a control device and a non-transitory computer readable medium.

(ii) Related Art

Japanese Unexamined Patent Application Publication No. 8-97991 discloses a copying machine that includes a document reading apparatus that reads an image of a document in response to an instruction for reading and that outputs image data, an image memory that stores the image data, an image output device that performs an output process of making a copy on paper, based on the image data in the image memory and discharging the paper, a controller that transmits an instruction for reading to the document reading apparatus and that transmits an instruction for outputting with a timing with which the image output device finishes the output process when the document reading apparatus finishes reading the document.

SUMMARY

In some cases, a document reading apparatus that reads a document at a first speed and an image output device that outputs an image to a medium at a second speed higher than the first speed are used, and the document reading apparatus reads the image data of the document while the image output device outputs the image data of the document to the medium.

In these cases, if the image output device starts outputting after the document reading apparatus starts reading and after a wait time for causing the document reading apparatus to finish reading and the image output device to finish outputting at the same time has elapsed, there is a possibility that image data at a position at which compositing starts is outputted before an additional image is composited at the position at which compositing starts when it is determined that reading the document is finished. That is, in the case where the additional image is composited at the position at which compositing starts when it is determined that reading the document is finished, there is a possibility that the document reading apparatus cannot read the image data of the document while the image output device outputs the image data of the document to the medium.

Aspects of non-limiting embodiments of the present disclosure relate to a document reading apparatus that is capable of reading the image data of a document while an image output device outputs the image data of the document to a medium even in the case where an additional image is composited at a position at which compositing starts when it is determined that reading the document is finished.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control device including a processor configured to: instruct a document reading apparatus that reads a document at a first speed to read image data of the document; and control an image output device that outputs an image to a medium at a second speed higher than the first speed such that the image data of the document starts to be outputted to the medium after reading is started and after a wait time depending on a position at which an additional image starts to be composited when it is determined that reading is finished has elapsed.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will hereinafter be described in detail with reference to the attached drawings.

Summary of Present Exemplary Embodiment

According to the present exemplary embodiment, a control device instructs a document reading apparatus that reads a document at a first speed to read image data of the document, and controls an image output device that outputs an image to a medium at a second speed higher than the first speed such that the image data of the document starts to be outputted to the medium after reading is started and after a wait time depending on a position at which an additional image starts to be composited when it is determined that reading is finished has elapsed.

It is also said that according to the present exemplary embodiment, a control device instructs a document reading apparatus that reads a document at a first speed to read image data of the document, and controls an image output device that outputs an image to a medium at a second speed higher than the first speed such that image data at a position at which an additional image starts to be composited when it is determined that reading is finished in the image data of the document is outputted to the medium after reading is finished.

The additional image described herein is added to the image data. In the following description, an annotation image is taken as an example of the additional image. However, this is not a limitation, and the image may contain any information.

The medium is an object that is used to report information, and the image data is outputted thereto. Examples of the medium include paper and a plastic sheet. In the following description, paper is taken as an example.

A control device may be a device only for controlling the document reading apparatus that reads the image data of the document and the image output device that outputs the image data of the document to the medium. Alternatively, the control device may be a device that is also capable of acquiring the image data of the document that is read by the document reading apparatus, processing the image data, and outputting the image data to the image output device, that is, an image processing apparatus. In the following description, the case where the control device is the image processing apparatus is taken as an example.

Entire Configuration of Copy System

Figure 1:
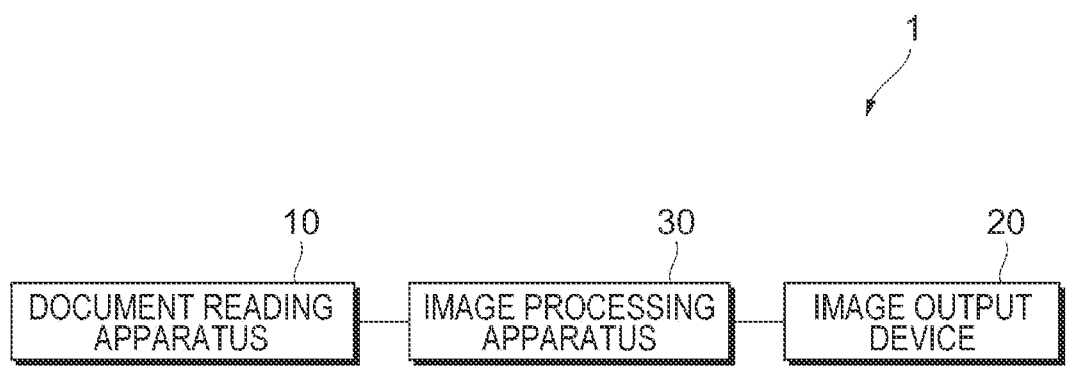
FIG. 1 is a block diagram illustrating an example of the entire configuration of a copy system according to the exemplary embodiment of the present disclosure.

FIG. 1 is a block diagram illustrating an example of the entire configuration of a copy system 1 according to the present exemplary embodiment. The copy system 1 includes a document reading apparatus 10, an image output device 20, and an image processing apparatus 30 as illustrated. The document reading apparatus 10 reads a document and outputs the image data thereof. The image output device 20 transfers an image to paper, based on the image data and discharges the paper. The image processing apparatus 30 acquires the image data from the document reading apparatus 10 and processes the image data for an output to the image output device 20. The copy system 1 is capable of making a synchronous cutting copy. The synchronous cutting copy is a copy acquired in a manner in which copy paper is cut so as to be suitable for the length of the document.

Hardware Configuration of Document Reading Apparatus

Figure 2:
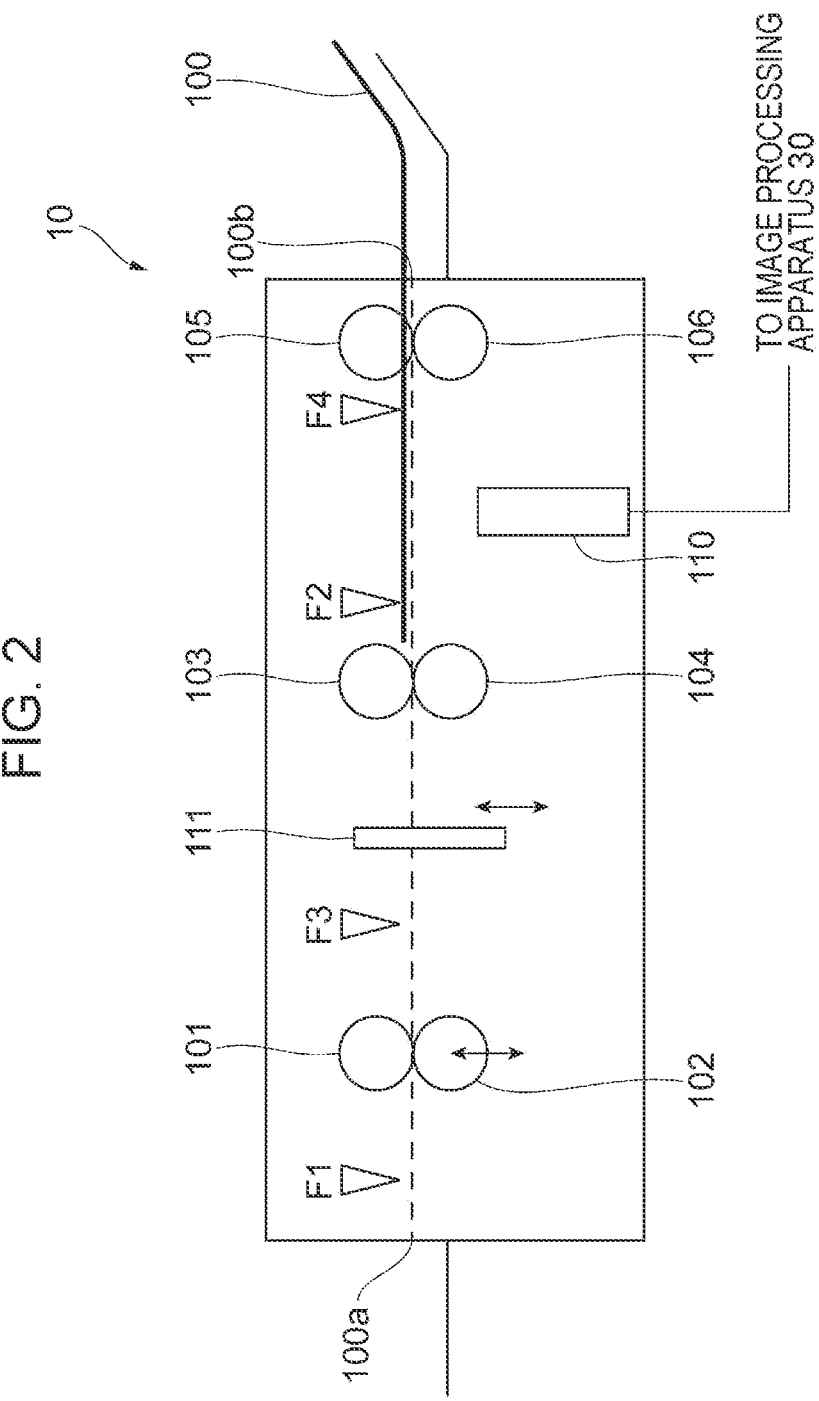
FIG. 2 illustrates an example of the hardware configuration of a document reading apparatus according to the exemplary embodiment of the present disclosure.

FIG. 2 illustrates an example of the hardware configuration of the document reading apparatus 10 according to the present exemplary embodiment.

In the document reading apparatus 10, transport rollers 101 to 106 for transporting a document 100 in a transport direction are disposed. As for the transport rollers 101 to 106, two rollers that are arranged in the vertical direction in FIG. 2 are paired for three transport units in total. The document 100 enters via a document entrance 100a, is transported by the transport rollers 101 and 102 corresponding to the first transport units, the transport rollers 103 and 104 corresponding to the second transport units, and the transport rollers 105 and 106 corresponding to the third transport units in turn, and is discharged via a document exit 100b.

A reading sensor 110 is disposed between the transport rollers 103 and 104 corresponding to the second transport units and the transport rollers 105 and 106 corresponding to the third transport units. The reading sensor 110 is a one-dimensional sensor that is acquired by arranging a large number of light detection sensors in a direction perpendicular to the transport direction of the document 100. The light detection sensors detect reflection light from a surface of the document 100. The output signals of the light detection sensors are sequentially scanned in a predetermined period and sequentially converted into digital signals. Consequently, the image data of a straight portion that is included in the entire image on the surface of the document 100 and that faces the light detection sensors is generated. The image data is continuously generated while the document 100 is transported, and the image data that represents the image on the surface of the document 100 is consequently generated. The image data that is acquired by the reading sensor 110 is transmitted to the image processing apparatus 30.

Sensors F1 to F4 for detecting edge portions of the document 100 that pass are disposed at points on a transport path for the document 100. A gate 111 is disposed between the transport rollers 101 and 102 corresponding to the first transport units and the transport rollers 103 and 104 corresponding to the second transport units. The gate 111 opens only while the reading sensor 110 reads the document 100 and allows the document 100 to pass toward the second transport units.

Hardware Configuration of Image Output Device

Figure 3:
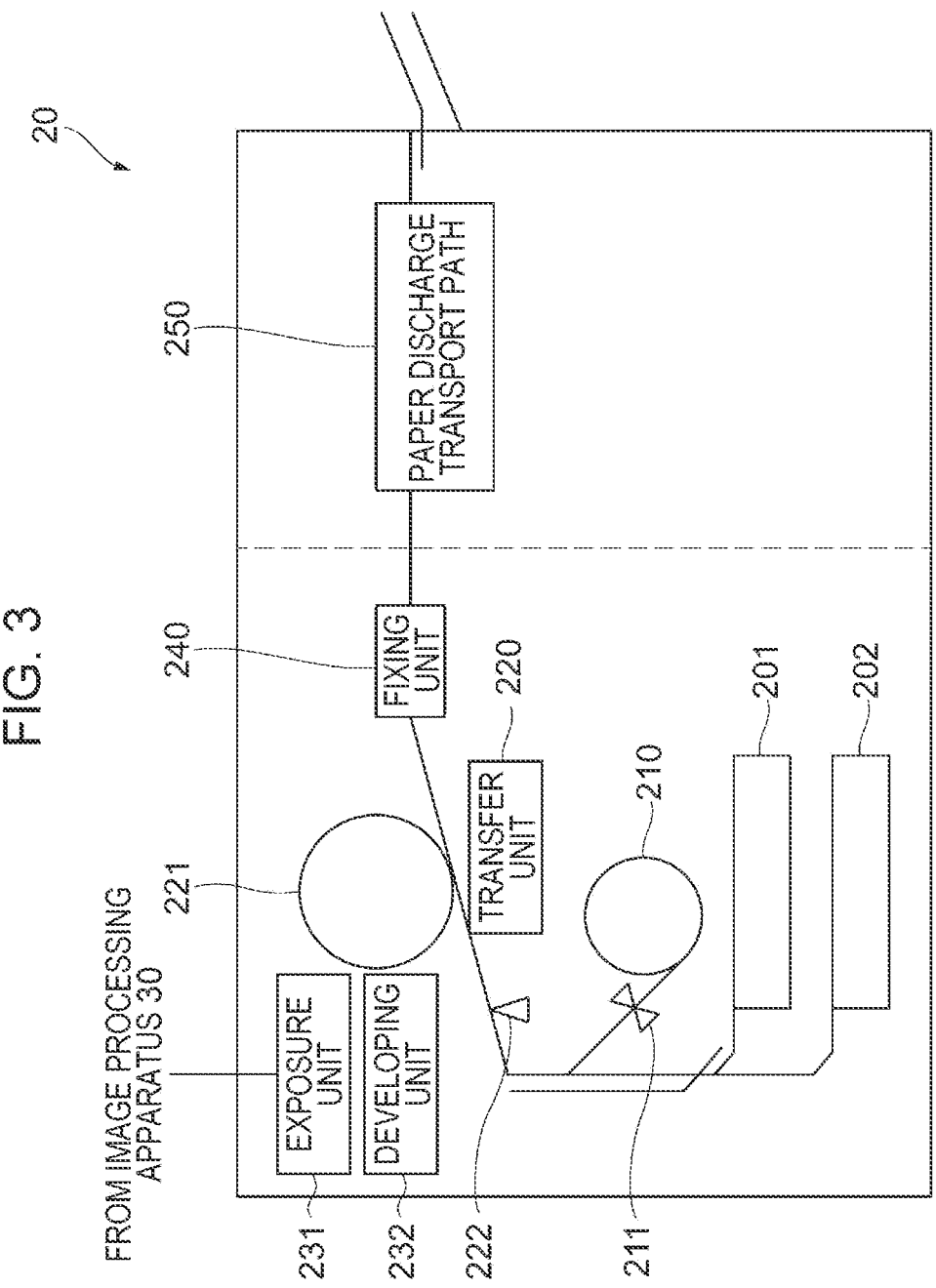
FIG. 3 illustrates an example of the hardware configuration of an image output device according to the exemplary embodiment of the present disclosure.

FIG. 3 illustrates an example of the hardware configuration of the image output device 20 according to the present exemplary embodiment.

The image output device 20 includes cut paper supplying units 201 and 202 and a roll paper supplying unit 210 as illustrated. The image output device 20 also includes a cutter 211 for cutting copy paper that is fed from the roll paper supplying unit 210. Copy paper in the cut paper supplying units 201 and 202 or the copy paper that is wound around the roll paper supplying unit 210 is selected for copying, based on an operation of the user. The selected copy paper is transported to a transfer unit 220 in response to an instruction for outputting from the image processing apparatus 30. A resist sensor 222 that detects the copy paper that comes is disposed in front of the transfer unit 220. An exposure unit 231 exposes the surface of a transfer drum 221 that rotates at a predetermined speed to light, based on the image data that is supplied from the image processing apparatus 30 and forms a latent image depending on the image data. A developing unit 232 supplies toner to the surface of the transfer drum 221 on which the latent image is thus formed and forms a toner image depending on the image data on the surface of the transfer drum 221. The transfer unit 220 presses the copy paper against the surface of the transfer drum 221 and transfers the toner image on the surface of the transfer drum 221 to the copy paper. The copy paper to which the toner image is thus transferred is subjected to a fixing process by a fixing unit 240 and is subsequently discharged via a paper discharge transport path 250.

Hardware Configuration of Image Processing Apparatus

Figure 4:
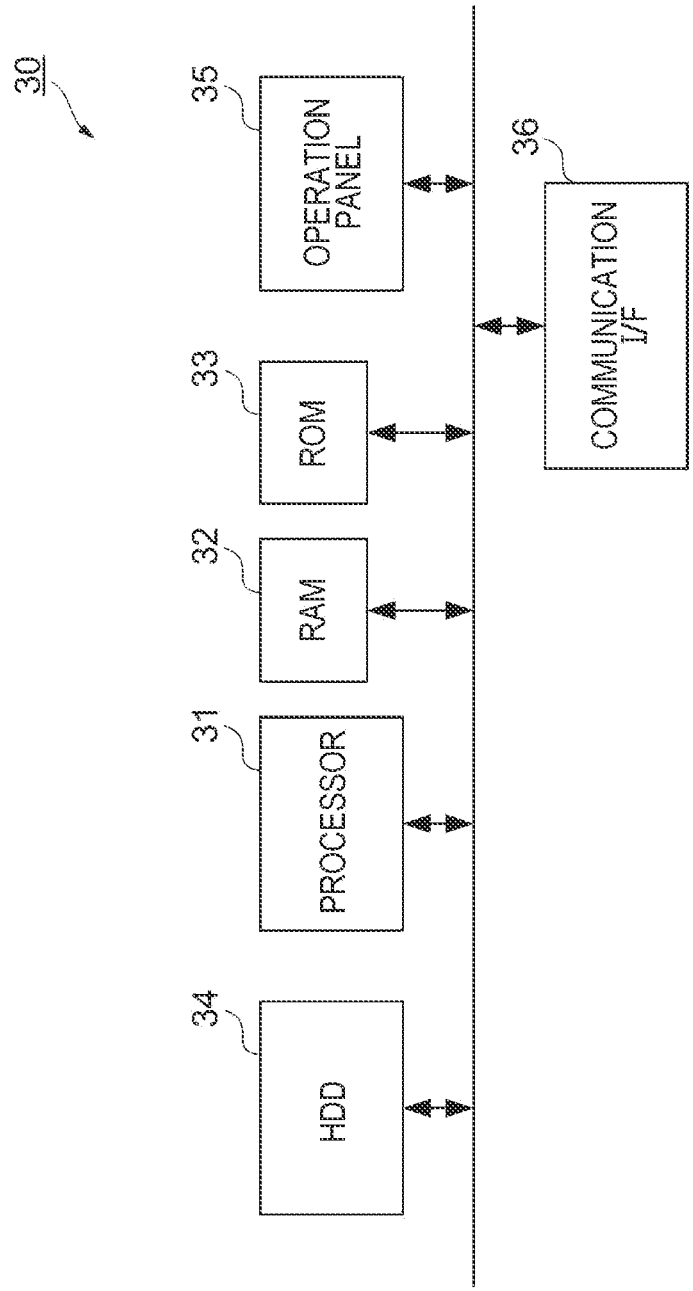
FIG. 4 illustrates an example of the hardware configuration of an image processing apparatus according to the exemplary embodiment of the present disclosure.

FIG. 4 illustrates an example of the hardware configuration of the image processing apparatus 30 according to the present exemplary embodiment. The image processing apparatus 30 includes a processor 31, a random access memory (RAM) 32, a read only memory (ROM) 33, a hard disk drive (HDD) 34, an operation panel 35, and a communication interface (referred to below as a "communication I/F") 36 as illustrated.

The processor 31 loads various programs that are stored in, for example, the ROM 33 into the RAM 32 and runs the programs to perform the functions of the image processing apparatus 30 described later.

The RAM 32 is a memory that is used, for example, as a work memory for the processor 31.

The ROM 33 is a memory that stores, for example, the various programs that are run by the processor 31.

The HDD 34 stores, for example, the image data that is acquired by reading the document by using the document reading apparatus 10, and an example thereof is a magnetic disk device.

The operation panel 35 displays various kinds of information and receives an operation input from the user, and an example thereof is a touch screen. The operation panel 35 includes a display that displays various kinds of information and a position detecting sheet that detects a position that is specified by a finger or an instruction unit such as a stylus pen. A display and a keyboard may be used instead of the touch screen.

The communication I/F 36 transmits and receives various kinds of information to and from another device via a communication line not illustrated.

Summary of Operation of Copy System

The additional image will now be described as a premise according to the present exemplary embodiment.

Figure 5:
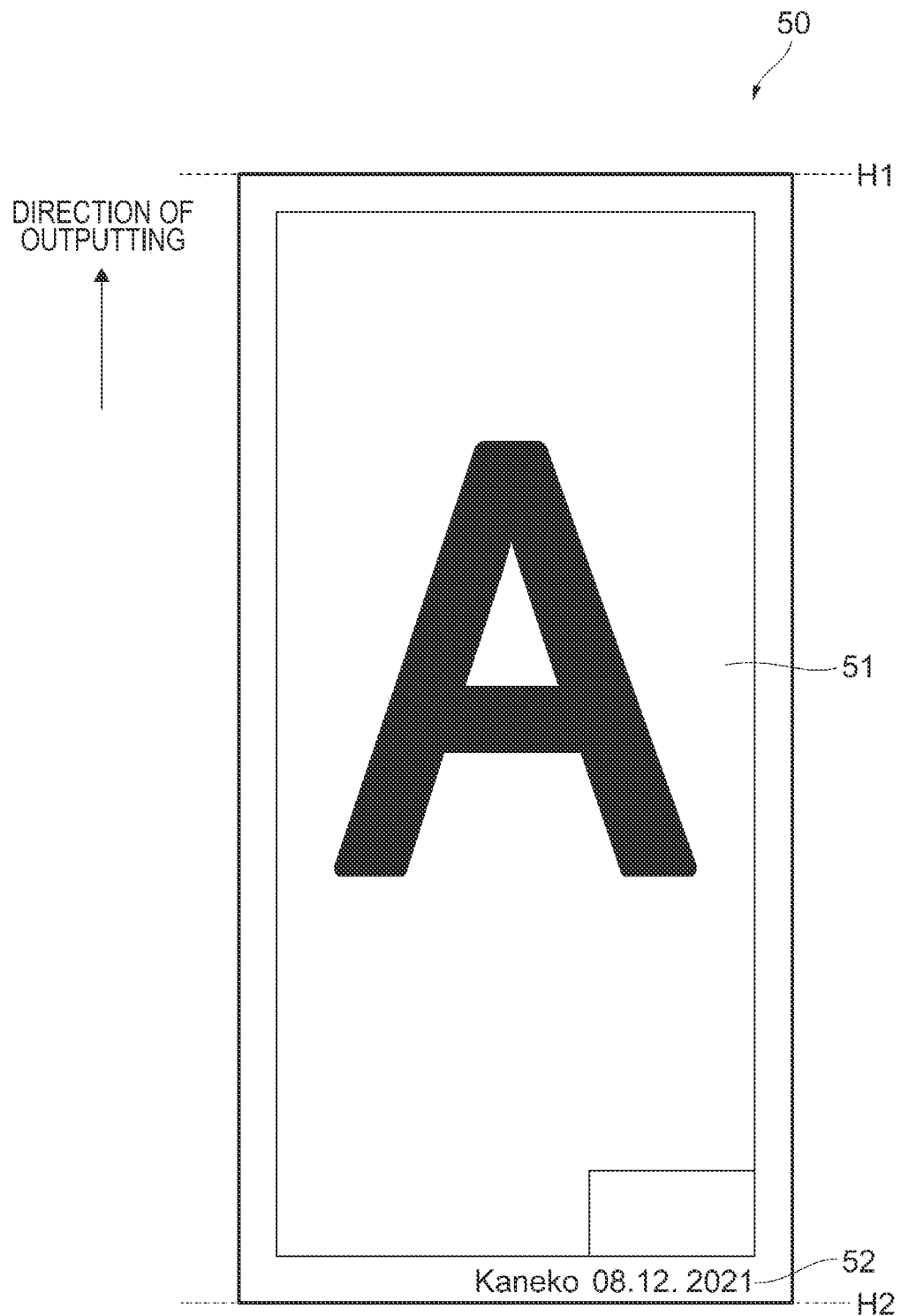
FIG. 5 illustrates an example of printing an additional image on copy paper.

FIG. 5 illustrates an example of printing the additional image on copy paper 50. In the example illustrated, a copy image 51 is formed on the copy paper 50, and an annotation 52 that is an example of the additional image is superimposed and printed. Here, an upward direction with respect to the paper coincides with a direction in which the copy paper 50 is outputted. Accordingly, an upper edge portion of the paper among the edge portions of the copy paper 50 is referred to as a paper leading edge H1, and a lower edge portion of the paper is referred to as a paper trailing edge H2.

In the figure, a character string "Kaneko 08.12.2021" that represents a user and a date is printed as the annotation 52. However, this is just an example. Any information may be printed.

In the figure, the annotation 52 is printed on the lower right near the paper trailing edge H2. However, the user may freely specify a print position. For example, a standard in the print position of the annotation 52 may be the paper leading edge H1 or the paper trailing edge H2. The print position of the annotation 52 may be expressed as an offset from the standard.

In the case where the document reading apparatus 10 reads the document while the image output device 20 outputs the image according to the present exemplary embodiment, the image processing apparatus 30 reads the image data from the document reading apparatus 10 and calculates an outputting start timing with which the image is transferred to the copy paper.

Figure 6:
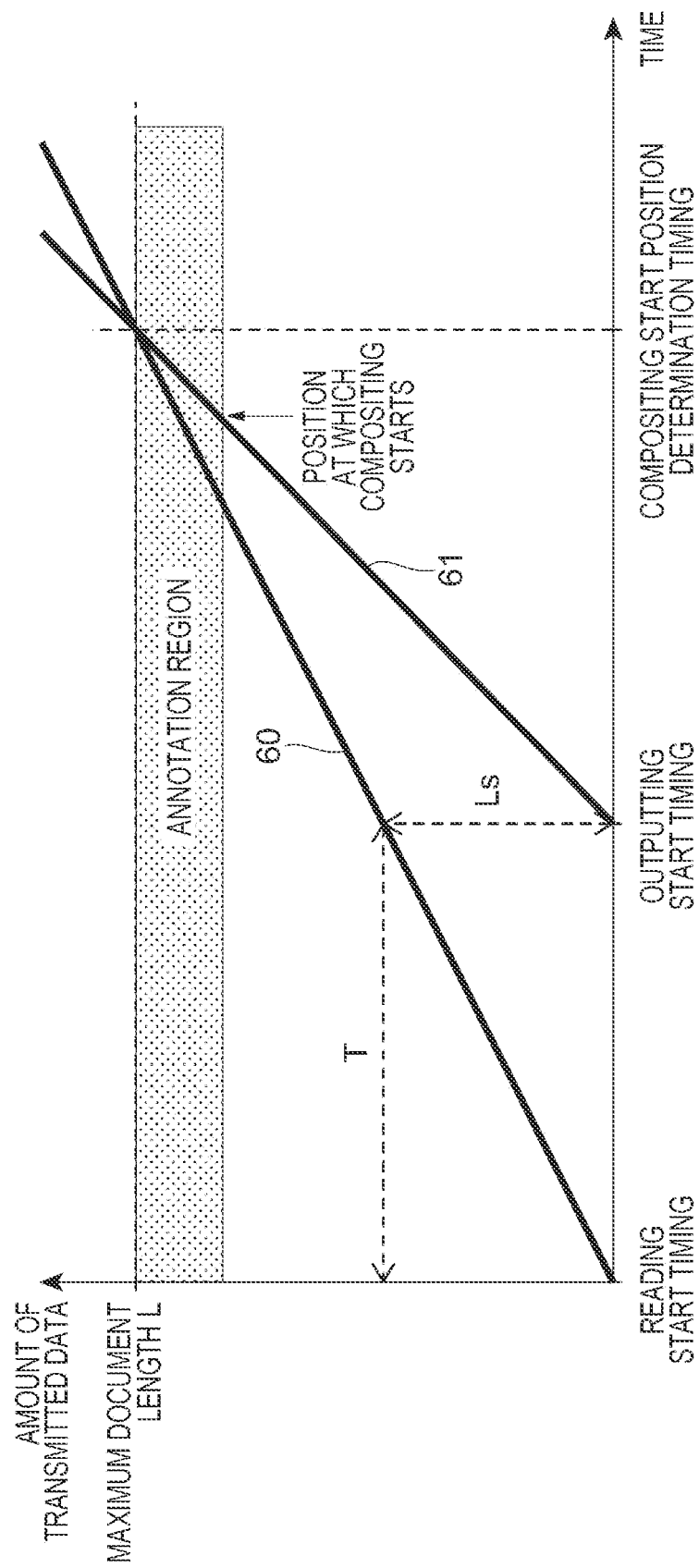
FIG. 6 is a graph illustrating a conventional outputting start timing.
Figure 7:
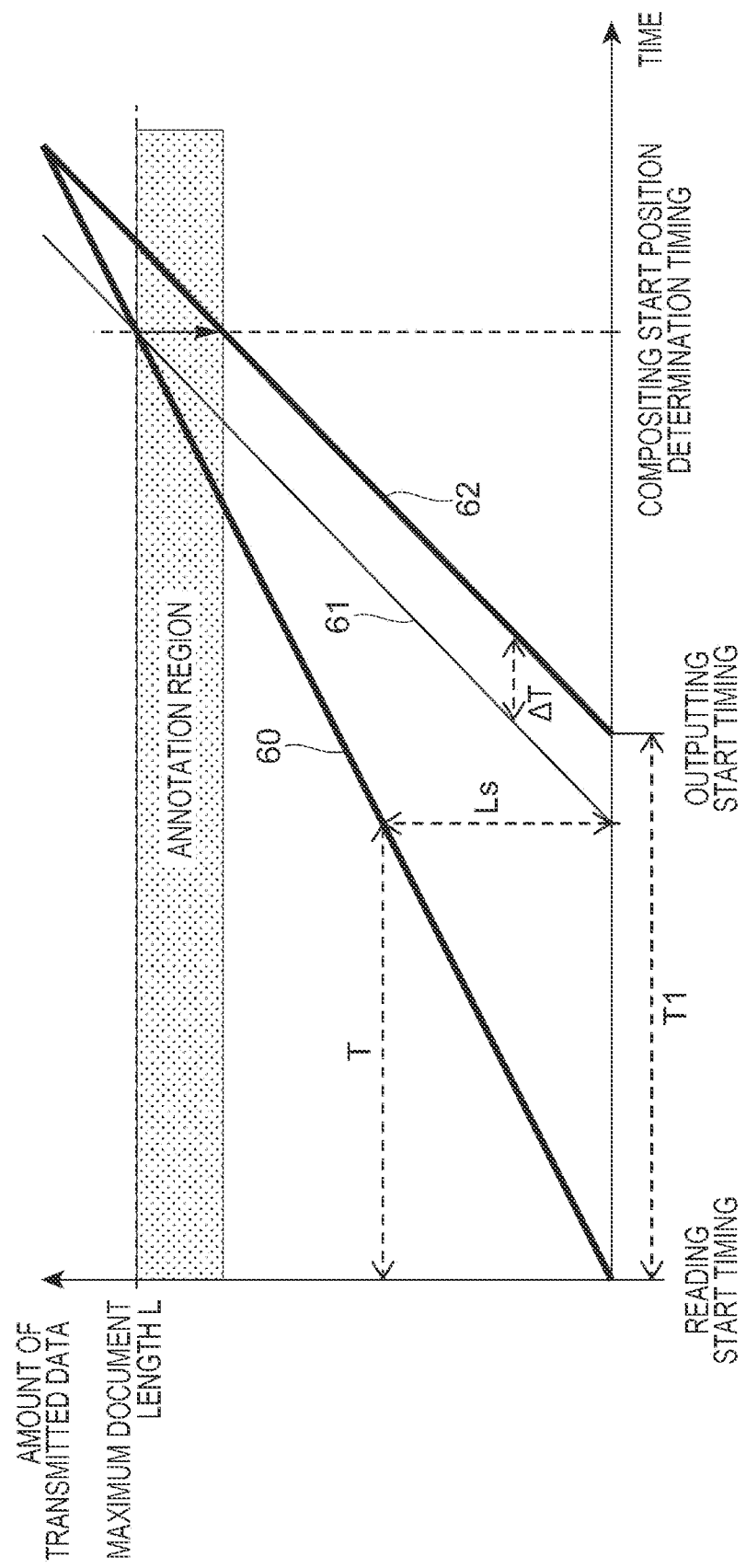
FIG. 7 is a graph illustrating an outputting start timing according to the exemplary embodiment of the present disclosure.

FIG. 6 and FIG. 7 are graphs illustrating the outputting start timing. In these graphs, the horizontal axis represents a time, the vertical axis represents the amount of transmitted data, a straight line 60 represents reading, and a straight line 61 represents outputting. In the graphs, an annotation region near the paper trailing edge is illustrated by dot hatching.

FIG. 6 illustrates a conventional outputting start timing.

In FIG. 6, the image processing apparatus 30 delays the outputting start timing so as to finish reading a document that has a predetermined maximum document length L and finish outputting at the same time in the case where reading and outputting are simultaneously progressed. Specifically, the image processing apparatus 30 transmits the outputting start timing to the image output device 20. The outputting start timing is a timing after the reading start timing with which the document reading apparatus 10 starts to read the image data and after a wait time T has elapsed. The wait time T is a time in consideration of a difference between a reading speed corresponding to an example of a first speed of the document reading apparatus 10 and an outputting speed corresponding to an example of a second speed of the image output device 20.

In the case where the additional image is formed in a paper trailing edge base point specifying method, however, the image processing apparatus 30 cannot calculate a position at which the additional image starts to be composited before the document reading apparatus 10 finishes reading the document and before an output paper length is determined. In FIG. 6, the image data at the position at which compositing starts is outputted before reading the document is finished and before the position at which the additional image starts to be composited is determined, the additional image is not composited, and the image data is outputted.

In view of this, according to the present exemplary embodiment, the image processing apparatus 30 delays the outputting start timing by a length from the paper trailing edge to the position at which the additional image starts to be composited in the case where the position at which the additional image starts to be composited is specified by using the paper trailing edge base point specifying method.

FIG. 7 illustrates the outputting start timing in this case. In FIG. 7, ΔT corresponds to the delay by the length from the paper trailing edge to the position at which the additional image starts to be composited. Specifically, ΔT is calculated as (an offset value from a paper trailing edge base point to the trailing edge of the additional image+the height of the additional image)/an output speed. The outputting start timing is thus delayed by the length from the paper trailing edge to the position at which the additional image starts to be composited. Consequently, a wait time from the reading start timing until the outputting start timing is changed from T into T1, and a straight line that represents outputting shifts in the right-hand direction as illustrated as a straight line 62. Consequently, the additional image is composited after reading the document is finished. In this way, the additional image may be composited with certainty.

Functional Configuration of Image Processing Apparatus

Figure 8:
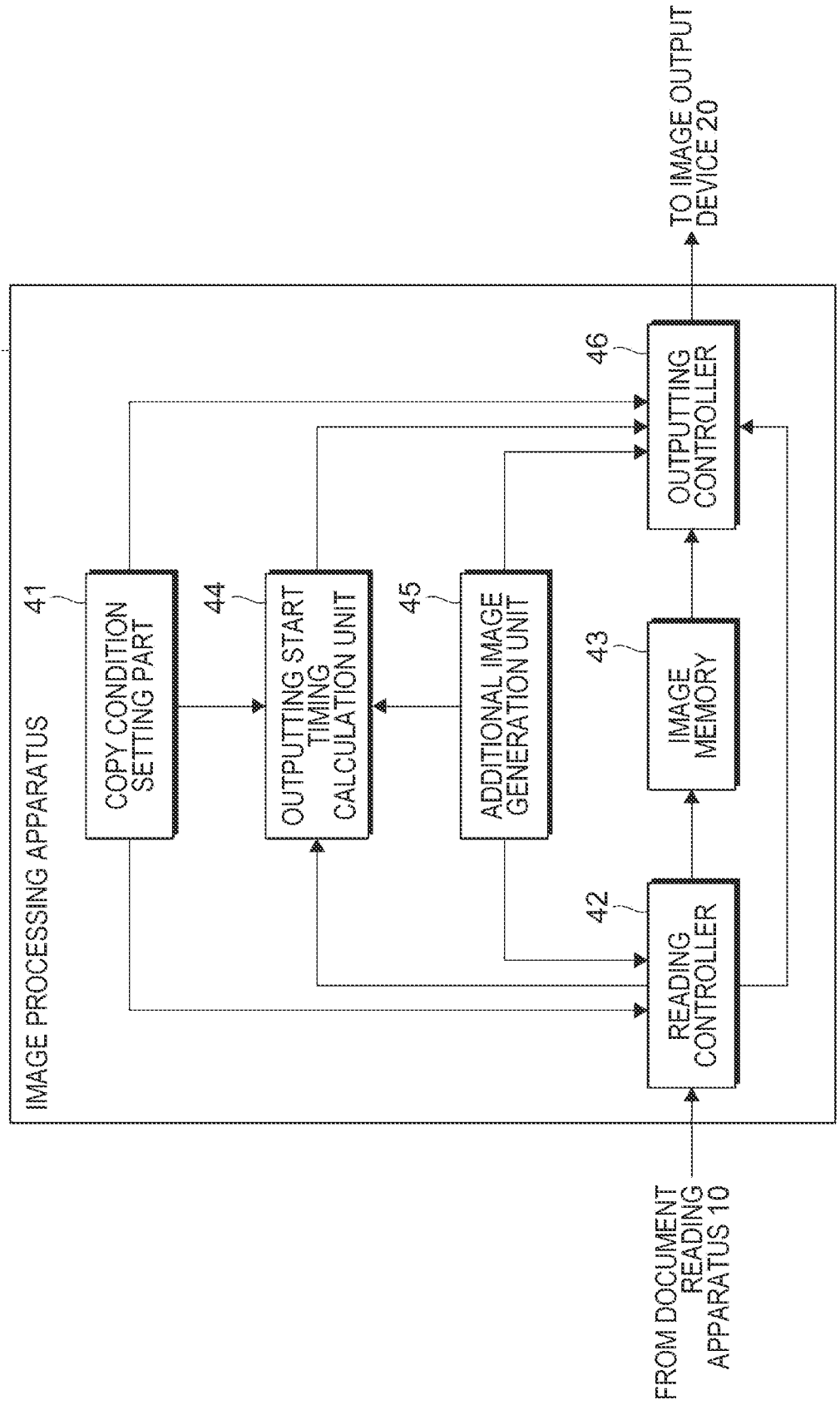
FIG. 8 is a block diagram illustrating an example of the functional configuration of the image processing apparatus according to the exemplary embodiment of the present disclosure.

FIG. 8 is a block diagram illustrating an example of the functional configuration of the image processing apparatus 30 according to the present exemplary embodiment. The image processing apparatus 30 includes a copy condition setting part 41, a reading controller 42, an image memory 43, an outputting start timing calculation unit 44, an additional image generation unit 45, and an outputting controller 46 as illustrated.

The copy condition setting part 41 sets a copy condition that the user instructs on the operation panel 35. Examples of the copy condition include a selection from a fixed form copy and a synchronous cutting copy, magnification, paper, and an operation mode for the synchronous cutting copy. Examples of the copy condition also include the position at which the additional image starts to be composited. The position at which the additional image starts to be composited may be specified by using a base point for the position at which the additional image starts to be composited and an offset from the base point.

The reading controller 42 controls the document reading apparatus 10 that reads the document.

Specifically, the reading controller 42 determines whether a document is inserted via the document entrance 100*a* and acquires the entire storage area in the image memory 43 if it is determined that the document is inserted.

The reading controller 42 instructs the document reading apparatus 10 to read the document and acquires the image data that is transmitted from the document reading apparatus 10 in response to the instruction. The reading controller 42 causes the image memory 43 to store the acquired image data.

The reading controller 42 sets the cut length of the copy paper and requests cutting or sets the position of the additional image and requests compositing the additional image.

According to the present exemplary embodiment, the reading controller 42 performs the process as an example in which the document reading apparatus is instructed to read the image data of the document.

The image memory 43 stores the image data that the reading controller 42 reads from the document reading apparatus 10. An example of the image memory 43 is the HDD 34.

The outputting start timing calculation unit 44 acquires the wait time T1 from the reading start timing until the outputting start timing if it is determined that reading and outputting are simultaneously progressed depending on the copy condition that is set by the copy condition setting part 41. Specifically, the outputting start timing calculation unit 44 acquires the wait time T that is used to finish reading the document that has the predetermined maximum document length and finish outputting at the same time. In the case where the additional image is specified by using the paper trailing edge base point, the outputting start timing calculation unit 44 acquires the wait time ΔT for the length from the paper trailing edge to the position at which the additional image starts to be composited. For example, the outputting start timing calculation unit 44 calculates the wait time ΔT as (an offset value from the paper trailing edge base point to the trailing edge of the additional image+the height of the additional image)/the output speed. The outputting start timing calculation unit 44 acquires the wait time T1 by adding the wait time ΔT into the wait time T. The outputting start timing calculation unit 44 calculates the outputting start timing, based on the reading start timing and the wait time T1 and transmits the calculated outputting start timing to the outputting controller 46.

According to the present exemplary embodiment, the wait time T1 is used as an example of a wait time depending on the position at which the additional image starts to be composited when it is determined that reading is finished. According to the present exemplary embodiment, the outputting start timing calculation unit 44 performs this process as an example in which the image output device is controlled such that the image data of the document starts to be outputted to the medium after the document reading apparatus starts reading and after the wait time has elapsed.

According to the present exemplary embodiment, the wait time T is used as an example of a first wait time for causing the document reading apparatus to finish reading and the image output device to finish outputting at the same time. According to the present exemplary embodiment, the wait time ΔT is used as an example of a second wait time depending on the position at which compositing starts when it is determined that reading is finished.

According to the present exemplary embodiment, the outputting start timing calculation unit 44 performs this process as an example in which the second wait time is calculated based on the position of a trailing edge of a composite region, with which the additional image is composited, in a sub scanning direction and the length of the composite region in the sub scanning direction.

When reading the document is finished, the outputting start timing calculation unit 44 determines whether the current time is earlier than the calculated outputting start timing and transmits the current time as a new outputting start timing to the outputting controller 46 if the current time is earlier than the calculated outputting start timing.

The additional image generation unit 45 generates the additional image. For example, the additional image generation unit 45 may generate the additional image, based on information about the user and information about date but is not limited thereto. The additional image generation unit 45 stores information about the height of the additional image, that is, the length of the additional image in the sub scanning direction.

The outputting controller 46 controls the image output device 20 that outputs the image data that is read from the image memory 43.

Specifically, the outputting controller 46 determines whether the reading controller 42 requests outputting and causes the image output device 20 to prepare the operation thereof if outputting is requested. The outputting controller 46 instructs the image output device 20 to start printing at a time acquired by subtracting a paper delay time Td from the outputting start timing that is transmitted from the outputting start timing calculation unit 44. The outputting controller 46 outputs the image data that is read from the image memory 43 to the image output device 20 after the instruction for starting printing in response to a request for transmitting the image data from the image output device 20.

The outputting controller 46 determines whether the print position of the image data reaches the position at which the additional image starts to be composited and outputs the image data to the image output device 20 while compositing the additional image that is generated by the additional image generation unit 45 if the print position reaches the position at which compositing starts. Since the image starts to be transferred to the copy paper with the outputting start timing that is transmitted from the outputting start timing calculation unit 44, the print position of the image data reaches the position at which the additional image starts to be composited after the document reading apparatus 10 finishes reading the document. That is, the outputting controller 46 outputs the image data with which the additional image is composited to the image output device 20 after the document reading apparatus 10 finishes reading the document.

According to the present exemplary embodiment, the outputting controller 46 performs this process as an example in which the image output device is controlled such that image data at the position at which the additional image starts to be composited when it is determined that reading is finished in the image data of the document is outputted to the medium after the document reading apparatus finishes reading.

According to the present exemplary embodiment, the outputting controller 46 performs this process as an example in which the image output device is controlled such that the image data of the composite region, with which the additional image is composited, in the image data of the document is outputted after the document reading apparatus finishes reading.

According to the present exemplary embodiment, the outputting controller 46 performs this process as an example in which the image output device is controlled such that the additional image is outputted so as to be superimposed on the image data of the composite region after the document reading apparatus finishes reading.

The outputting controller 46 reads the cut length that is set by the reading controller 42 and transmits the cut length to the image output device 20. The outputting controller 46 transmits the image data from the image memory 43 to the image output device 20 only in a period in which a request for transmitting the image data is received and stops transmitting the image data when the request for transmitting ends. The outputting controller 46 releases the image memory 43.

Example of Operation of Image Processing Apparatus

Figure 9:
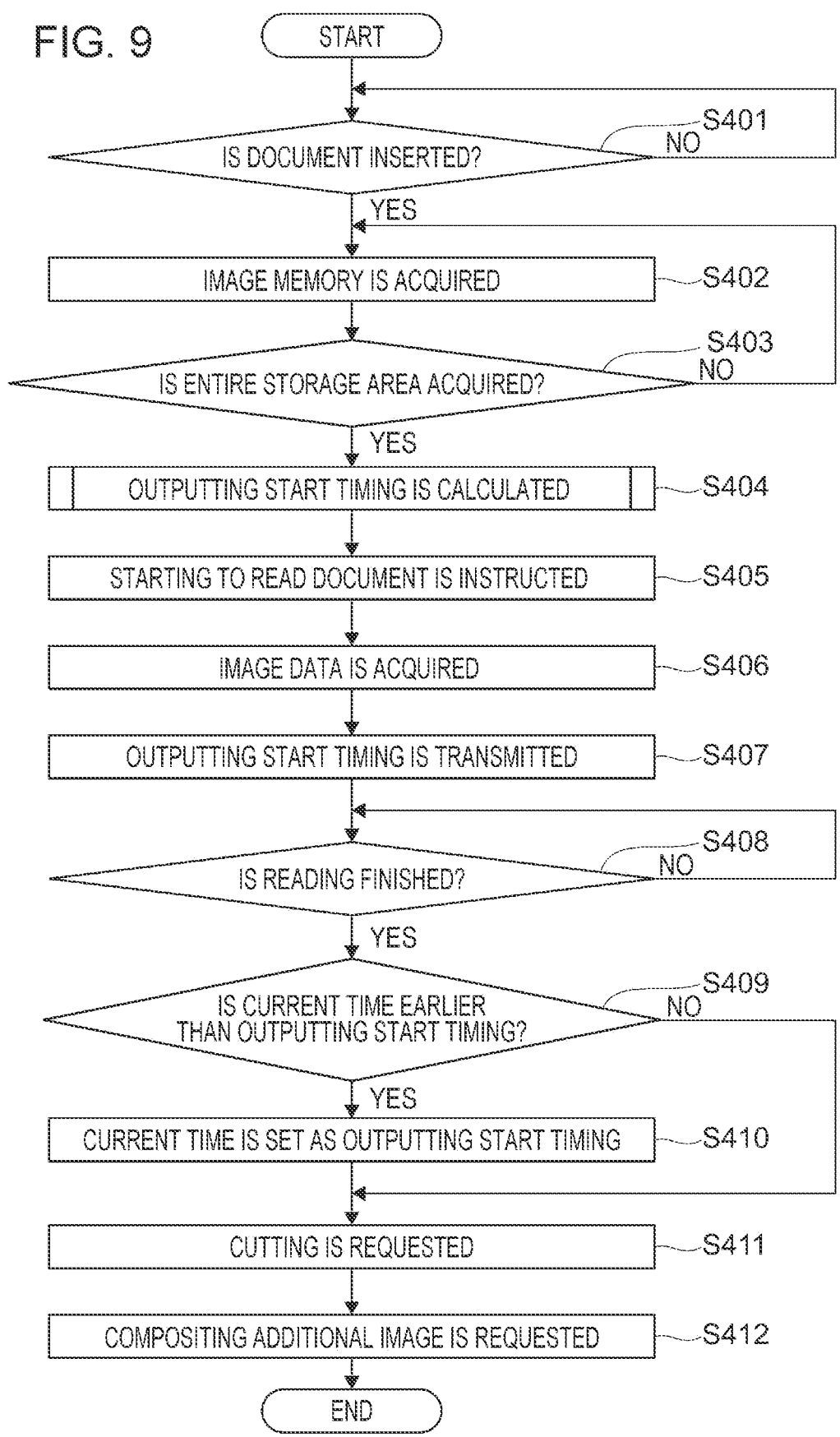
FIG. 9 is a flowchart of a reading routine of the image processing apparatus according to the exemplary embodiment of the present disclosure.
Figure 10:
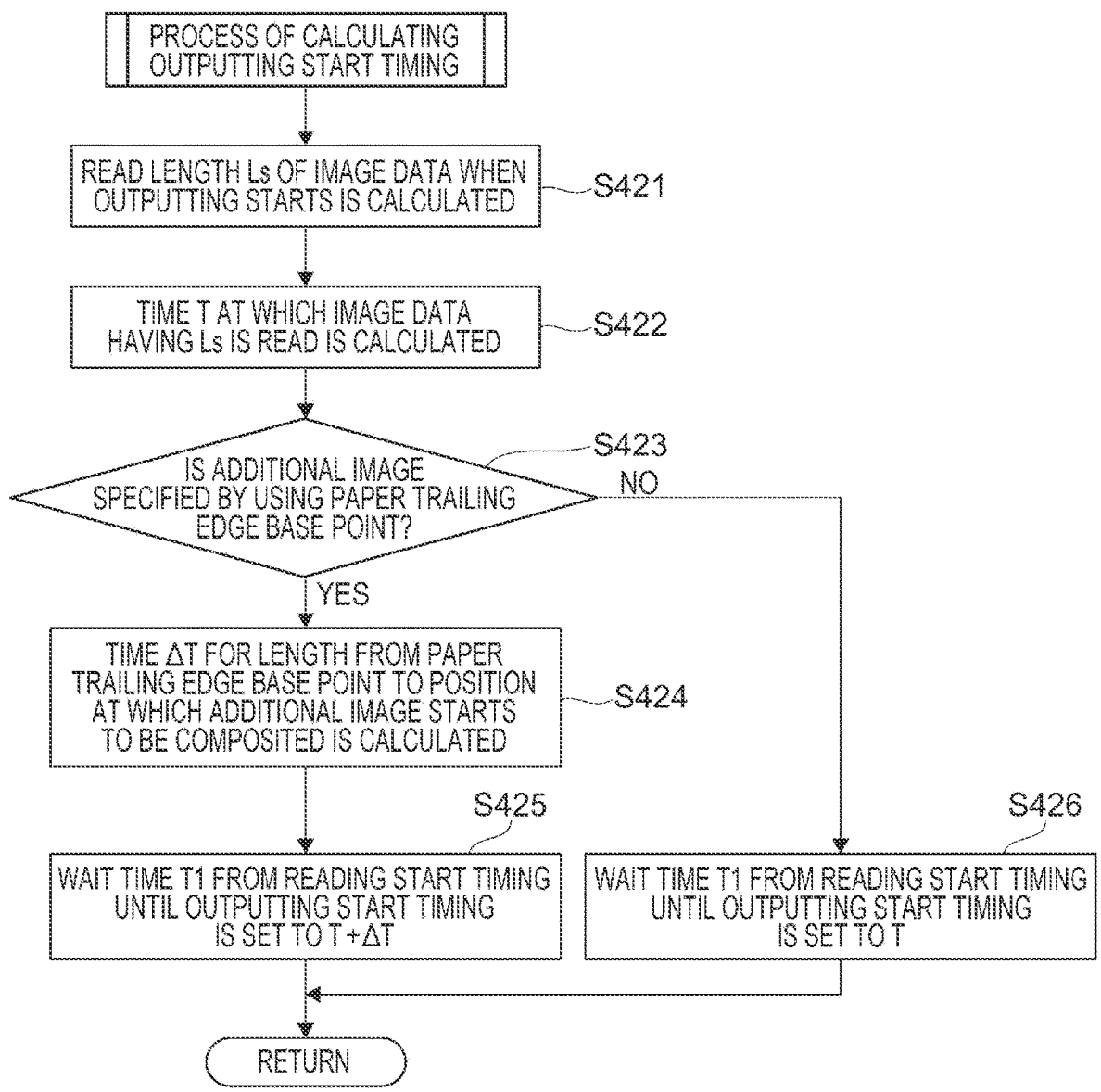
FIG. 10 is a flowchart illustrating the content of a process of calculating the outputting start timing.
Figure 11:
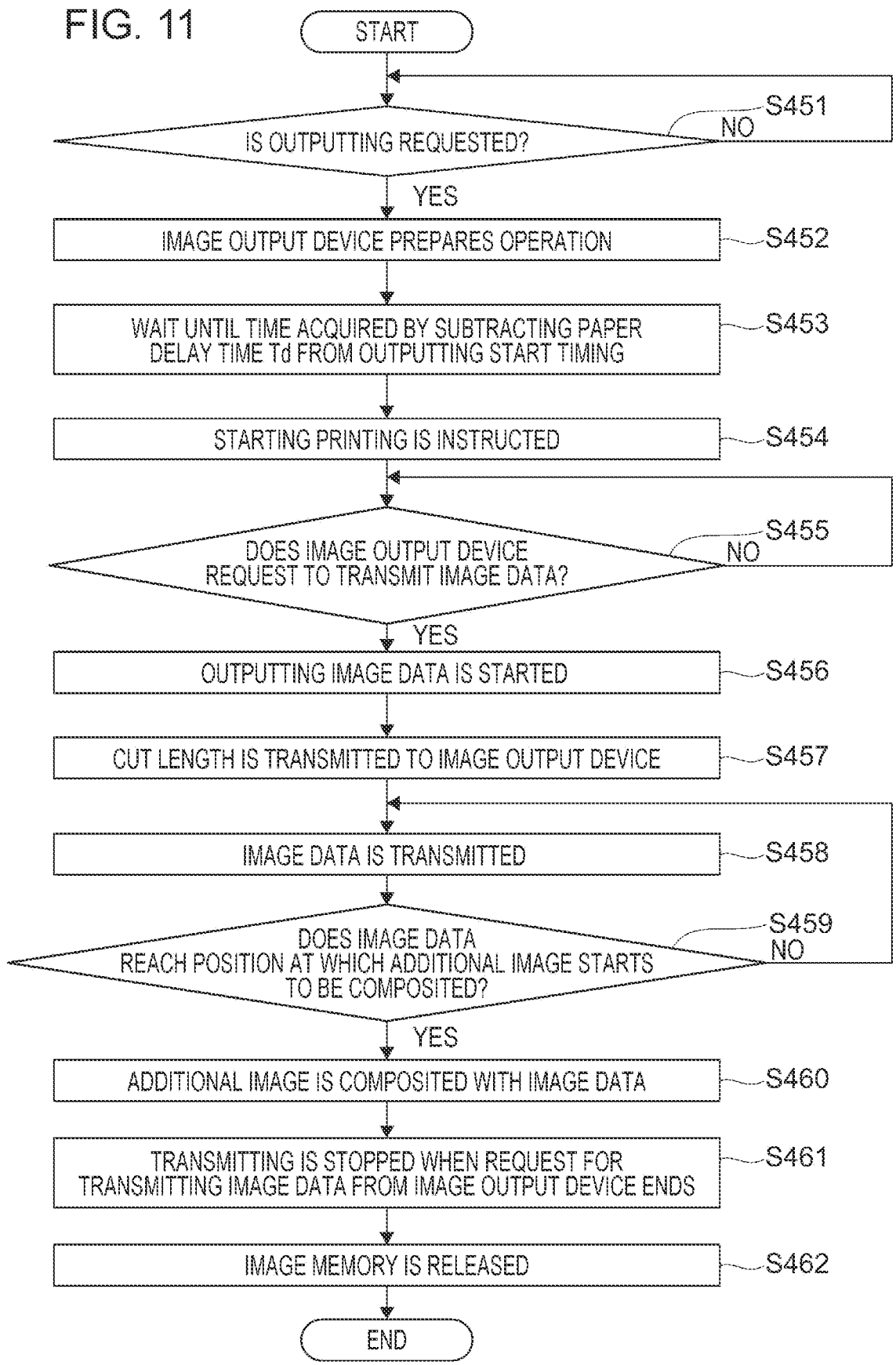
FIG. 11 is a flowchart of an outputting routine of the image processing apparatus according to the exemplary embodiment of the present disclosure.

FIG. 9 to FIG. 11 are flowcharts illustrating an example of the operation of the image processing apparatus 30 according to the present exemplary embodiment. In the case described herein, the copy condition setting part 41 sets the synchronous cutting copy as the selection from the fixed form copy and the synchronous cutting copy, sets an equal size as the magnification, and sets roll paper as the paper.

FIG. 9 is a flowchart for the reading routine of the image processing apparatus 30. After the copy condition setting part 41 sets the various copy conditions, the image processing apparatus 30 performs the reading routine.

As for the image processing apparatus 30, the reading controller 42 first determines whether a document is inserted via the document entrance 100a (a step 401) and waits as it is if no document is inserted as illustrated. If the document is inserted, and the sensor F1 detects the leading edge of the document, the reading controller 42 acquires the entire storage area in the image memory 43 as a storage area for storing the image data that is read from the document (a step 402). The reading controller 42 subsequently determines whether the entire storage area is acquired at the step 402 (a step 403) and performs a process at the step 402 again if the entire storage area is not acquired.

If the entire storage area is acquired at the step 402, the outputting start timing calculation unit 44 calculates the outputting start timing (a step 404). That is, the outputting start timing calculation unit 44 performs processes illustrated in FIG. 10 to acquire the wait time T1 from the reading start timing of the image data until the outputting start timing.

Subsequently, the reading controller 42 instructs the document reading apparatus 10 to start to read the document (a step 405). As a result, the light detection sensors that are included in the reading sensor 110 start to scan the output signals and sequentially transmit the image data that is acquired every time scanning is repeated to the image processing apparatus 30. Consequently, the reading controller 42 acquires the image data (a step 406).

Subsequently, the outputting start timing calculation unit 44 waits for the reading controller 42 to start to input the image data into the image memory 43 and sets the outputting start timing of the image data in response to the first input of the image data (a request for outputting) (a step 407). That is, a time acquired by adding the wait time T1 that is acquired at the step 404 into the current time at which the image data is inputted at the first time is set as the outputting start timing of the image data.

Subsequently, the reading controller 42 determines whether the document reading apparatus 10 finishes reading the document while continuing a process of acquiring the image data and inputting the image data into the image memory 43 (a step 408) and waits as it is if reading the document is not finished. When reading the document is finished, the outputting start timing calculation unit 44 determines whether the current time is earlier than the outputting start timing that is set at the step 407 (a step 409).

If the current time is earlier than the outputting start timing, the outputting start timing calculation unit 44 sets the current time as the new outputting start timing (a step 410). Here, the time that is set as the new outputting start timing is the current time for convenience. In a strict sense, the time may be acquired by adding a time required for transmitting information about time to the outputting controller 46 into the current time. If the current time is not earlier than the outputting start timing, the outputting start timing calculation unit 44 does not perform the step 410.

Subsequently, the reading controller 42 performs a process for transmitting a request for cutting (a step 411). That is, the reading controller 42 detects the length of the document by using the sensor F1 in the document reading apparatus 10 and sets the detected length of the document as the cut length of the copy paper.

Subsequently, the reading controller 42 performs a process for requesting compositing the additional image (a step 412). That is, the reading controller 42 sets the position of the leading edge and the position of the trailing edge of the composite region of the additional image. The case where the copy condition setting part 41 sets a paper leading edge base point as the base point on the composite region of the additional image will now be described. In this case, the reading controller 42 sets the position of an offset from the paper leading edge base point as the position of the leading edge of the composite region of the additional image. The reading controller 42 sets a position away from the position of the leading edge toward the trailing edge by the height of the additional image that is acquired from the additional image generation unit 45 as the position of the trailing edge of the composite region of the additional image. The case where the copy condition setting part 41 sets the paper trailing edge base point as the base point on the composite region of the additional image will now be described. In this case, the reading controller 42 sets a position away from the position of the length of the document that is detected at the step 411 toward the leading edge by an offset value from the paper trailing edge base point as the position of the trailing edge of the composite region of the additional image. The reading controller 42 sets a position away from the position of the trailing edge toward the leading edge by the height of the additional image that is acquired from the additional image generation unit 45 as the position of the leading edge of the composite region of the additional image. Through the above processing, the reading routine ends.

FIG. 10 is a flowchart illustrating the content of a process of calculating the outputting start timing at the step 404 in FIG. 9.

The outputting start timing calculation unit 44 first calculates a read length Ls of the image data when outputting starts (a step 421) as illustrated. The read length Ls of the image data corresponds to Ls illustrated in FIG. 6 and FIG. 7. Ls is calculated as an expression "Ls=L−(L×Si)/So" where Si is the reading speed of the document reading apparatus 10, and So is the output speed of the image output device 20.

Subsequently, the outputting start timing calculation unit 44 calculates a time T at which image data having Ls that is calculated at the step 421 is read (a step 422). Specifically, T is calculated as an expression "T=Ls/Si".

Subsequently, the outputting start timing calculation unit 44 determines whether the additional image is specified by using the paper trailing edge base point (a step 423).

If the additional image is specified by using the paper trailing edge base point, the outputting start timing calculation unit 44 calculates a time ΔT for a length from the paper trailing edge base point to the position at which the additional image starts to be composited (a step 424). Specifically, ΔT is calculated as an expression "ΔT=(the offset value from the paper trailing edge base point to the trailing edge of the additional image+the height of the additional image)/So".

The outputting start timing calculation unit 44 sets the wait time T1 from the reading start timing until the outputting start timing to a value acquired by adding ΔT that is calculated at the step 424 into T that is calculated at the step 422 (a step 425).

If the additional image is not specified by using the paper trailing edge base point, that is, if the additional image is not specified or if the additional image is specified by using the paper leading edge base point, the outputting start timing calculation unit 44 sets the wait time T1 from the reading start timing until the outputting start timing to T that is calculated at the step 422 (a step 426).

FIG. 11 is a flowchart illustrating the outputting routine of the image processing apparatus 30. The outputting routine is performed while the processes in FIG. 9 are performed.

As for the image processing apparatus 30, the outputting controller 46 first determines whether the reading controller 42 requests outputting (a step 451) and waits as it is if outputting is not requested as illustrated.

When the outputting start timing is set at the step 407 in FIG. 9 (the request for outputting), the result of determination at the step 451 is "YES", and the outputting controller 46 causes the image output device 20 to prepare the operation thereof (a step 452).

Subsequently, the outputting controller 46 acquires a time by subtracting the paper delay time Td from the outputting start timing that is set at the step 407 in FIG. 9, waits until the time (a step 453), and subsequently instructs the image output device 20 to start printing (a step 454). The paper delay time Td is a time required for the copy paper to reach the resist sensor 222 in front of the transfer unit 220 from paper supplying units (the cut paper supplying units 201 and 202 and the roll paper supplying unit 210). The paper delay time Td has a value that changes depending on a selection from the cut paper supplying units 201 and 202 and the roll paper supplying unit 210 among the paper supplying units. The roll paper supplying unit 210 is selected here. Accordingly, the paper delay time Td suitable for the roll paper supplying unit 210 is selected at the step 453, and a time at which an instruction for starting printing is transmitted is calculated based on the selected Td. Subsequently, the outputting controller 46 determines whether the image output device 20 requests to start to output the image data (a step 455).

As a result of an instruction for starting printing at the step 454, the copy paper is supplied to the image output device 20 from the roll paper supplying unit 210. When the copy paper reaches the position of the resist sensor 222, a request for starting to output the image data is transmitted from the image output device 20 to the image processing apparatus 30. In the case where the request for starting outputting is received before determination is made at the step 455, the outputting controller 46 starts to output the image data from the image memory 43 (a step 456).

Subsequently, the outputting controller 46 reads the cut length that is set at the step 411 in FIG. 9 and transmits the cut length to the image output device 20 (a step 457). As a result, the image output device 20 requests the image processing apparatus 30 to transmit the image data in a period in which the received cut length of the copy paper is fed from the roll paper supplying unit 210. The outputting controller 46 transmits the image data in response to this request (a step 458), and the image output device 20 transfers an image in accordance with the transmitted image data.

Subsequently, the outputting controller 46 determines whether the image data that is outputted from the image memory 43 reaches the position at which the additional image starts to be composited (a step 459). The position at which the additional image starts to be composited is the position of the leading edge of the composite region of the additional image that is set at the step 412 in FIG. 9. If the image data does not reach the position at which the additional image starts to be composited, the outputting controller 46 performs a process at the step 458 again. If the image data reaches the position at which the additional image starts to be composited, the outputting controller 46 composites the additional image that is generated by the additional image generation unit 45 with the image data in a period in which image data for the length of the additional image is read (a step 460).

The outputting controller 46 transmits the image data from the image memory 43 to the image output device 20 only in a period in which a request for transmitting the image data is received after transmitting the cut length at the step 457 and stops transmitting the image data when the request for transmitting ends (a step 461). The outputting controller 46 releases the image memory 43 (a step 462). Through the above processing, the outputting routine ends.

The operation of the image processing apparatus 30 according to the present exemplary embodiment is compared between the case where a first position at which compositing starts is set as the position at which the additional image starts to be composited and the case where a second position at which compositing starts is set as the position at which the additional image starts to be composited, and the second position is nearer than the first position at which compositing starts to the leading edge in the sub scanning direction. In this case, a wait time after the document starts to be read until the image data starts to be outputted in the latter case is longer than that in the former case. Accordingly, it is said that the present exemplary embodiment provides a control device that instructs the document reading apparatus that reads the document at the first speed to read the image data of the document and that controls the image output device that outputs the image to the medium at the second speed higher than the first speed such that the image data of the document starts to be outputted to the medium after reading is started and after the first wait time has elapsed in the case where the first position at which compositing starts is set as the position at which the additional image starts to be composited when it is determined that reading is finished and such that the image data of the document starts to be outputted to the medium after reading is started and after the second wait time longer than the first wait time has elapsed in the case where the second position at which compositing starts nearer than the first position at which compositing starts to the leading edge in the sub scanning direction is set as the position at which the additional image starts to be composited.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

Processing that is performed by the image processing apparatus 30 according to the present exemplary embodiment is prepared, for example, as a program such as application software.

In this case, a program for carrying out the present exemplary embodiment causes a computer to perform a function of instructing the document reading apparatus that reads the document at the first speed to read the image data of the document and a function of controlling the image output device that outputs the image to the medium at the second speed higher than the first speed such that the image data of the document starts to be outputted to the medium after reading is started and after the wait time depending on the position at which the additional image starts to be composited when it is determined that reading is finished has elapsed.

The program for carrying out the present exemplary embodiment may be provided by using a communication unit or may be provided as a program that is stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control device comprising:
a processor configured to:
read image data on a document;
before reading the image data is completed, start outputting the image data with which an additional image is added to a medium; and
after the reading of the image data has been started but before starting outputting the image data, calculate a wait time based on a predetermined maximum document length, a reading speed of the document, an outputting speed of the image data, a position of the additional image, and a length of the additional image,
wherein the starting outputting the image data to the medium is performed after the calculated wait time has elapsed.

2. The control device according to claim 1,
wherein the processor is configured to use, as the wait time, a sum of a first wait time for causing the document reading apparatus to finish reading and the image output device to finish outputting at the same time and a second wait time depending on the position at which adding the additional image starts.

3. The control device according to claim 2,
wherein the processor is configured to calculate the second wait time, based on a position of a trailing edge of a composite region in a sub scanning direction and a length of the composite region in the sub scanning direction, the additional image being added with the composite region.

4. The control device according to claim 1,
wherein the processor is configured to control the image output device such that image data of a composite region in the image data of the document is outputted after the document reading apparatus finishes reading, the additional image being added with the composite region.

5. The control device according to claim 4,
wherein the processor is configured to control the image output device such that the additional image is outputted so as to be superimposed on the image data of the composite region after the document reading apparatus finishes reading.

6. A non-transitory computer readable medium storing a program causing a computer to execute a process comprising:
reading image data on a document;
before reading the image data is completed, starting outputting the image data with which an additional image is added to a medium; and
after the reading of the image data has been started but before starting outputting the image data, calculating a wait time based on a predetermined maximum document length, a reading speed of the document, an outputting speed of the image data, a position of the additional image, and a length of the additional image,
wherein the starting outputting the image data to the medium is performed after the calculated wait time has elapsed.

7. A control device comprising:
means for reading image data on a document;
means for, before reading the image data is completed, starting outputting the image data with which an additional image is added to a medium; and
means for, after the reading of the image data has been started but before starting outputting the image data, calculating a wait time based on a predetermined maximum document length, a reading speed of the document, an outputting speed of the image data, a position of the additional image, and a length of the additional image, wherein the starting outputting the image data to the medium is performed after the calculated wait time has elapsed.

\* \* \* \* \*